United States Patent [19]
Keeler et al.

[11] Patent Number: 5,113,483
[45] Date of Patent: May 12, 1992

[54] NEURAL NETWORK WITH SEMI-LOCALIZED NON-LINEAR MAPPING OF THE INPUT SPACE

[75] Inventors: James D. Keeler; Eric J. Hartman, both of Austin, Tex.

[73] Assignee: Microelectronics and Computer Technology Corporation, Austin, Tex.

[21] Appl. No.: 538,833

[22] Filed: Jun. 15, 1990

[51] Int. Cl.$^5$ .............................................. G06F 15/18
[52] U.S. Cl. ......................................... 395/23; 395/24
[58] Field of Search ...................... 364/513; 395/23, 24

[56] References Cited

PUBLICATIONS

Marr, "A Theory of Cerebellar Cortex," Journal of Physiology, 202, 1969 pp. 437-470.
Albus, "Brains, Behavior & Robotics," Byte Books, Peterborough, N.H., Chapter 6, A Neuological Model, 1981, pp. 139-179.
Ito, "The Cerebellum and Neural Control," Raven Press, Chapter 10, Neuronal Network Model, 1984, pp. 115-130.
Farmer et al. "Predicting Chaotic Time Series," Physical Letters Review, 59, 1987, pp. 845-848.
Farmer et al. "Exploiting Chaos to Predict the Future and Reduce Noise", Los Alamos Preprint 88-901, 1988, pp. 1-54.
Keeler, "Comparison of Kanerva's SDM to Hopfield-Type Neural Networks," Cognitive Science, 12 1988, pp. 299-329.
Rogers, "Statistical Prediction with Kanerva's Sparse Distributed Memory," Neural Information Processing Systems, Edited by D. Touretzky, Morgan Kaufmann Publishers, San Mateo, CA, 1989, pp. 586-593.
Lapedes et al., "Nonlinear Signal Processing Using Neural Networks: Prediction and System Modelling," Los Alamos Technical Report LA-UR-87-2662, 1987.
Moody et al., "Learning with Localized Receptive Fields," Proceedings of the 1988 Connectionist Models Summer School, edited by D. Touretsky, G. Hinton, T. Sejnowski, and M. Kaufmann, 1988, pp. 133-143.

*Primary Examiner*—Allen R. MacDonald
*Attorney, Agent, or Firm*—Ross, Howison, Clapp & Korn

[57] ABSTRACT

A neural network includes an input layer comprising a plurality of input units (24) interconnected to a hidden layer with a plurality of hidden units (26) disposed therein through an interconnection matrix (28). Each of the hidden units (26) is a single output that is connected to output units (32) in an output layer through an interconnection matrix (30). Each of the interconnections between one of the hidden units (26) to one of the output units (32) has a weight associated therewith. Each of the hidden units (26) has an activation in the i'th dimension and extending across all the other dimensions in a non-localized manner in accordance with the following equation:

$$a_h = \sum_{i=1}^{n} C_{hi} e^{-\frac{(x_i - \mu_{hi})^2}{\sigma_{hi}^2}}$$

that the network learns by the Back Propagation method to vary the output weights and the parameters of the activation function $\mu_{hi}$ and $\sigma_{hi}$.

17 Claims, 4 Drawing Sheets

FIG. 9

NEURAL NETWORK WITH SEMI-LOCALIZED NON-LINEAR MAPPING OF THE INPUT SPACE

TECHNICAL FIELD OF THE INVENTION

The present invention pertains in general to neural networks, and more particularly, to a hidden layer for effecting a non-linear semi-localized mapping of the input space to the output.

BACKGROUND OF THE INVENTION

In general, a neural network consists of two major parts: the individual neural processing units and the network of interconnections among the processors. A neural network may have many processing units. Each unit receives different inputs from many other units and transmits an output to other units. The system has distributed control. This means there is no executive; each processor executes its operation autonomously without explicit knowledge of the system as a whole.

Neural processing elements accept incoming signals from other units, perform simple operations on those signals, and compute single valued outputs. These three functions correspond to three different parts of a general neural processing unit-input, activation, and output. First, for a system of n processing units, there may be as many as n−1 inputs into a single arbitrary unit $u_i$. These inputs come from the outputs $o_j$ of other units. The output values are modified by a weighting factor $w_{ij}$ representing the relative connection strength of unit j to unit i. A net input function determines how the inputs should be combined to get a net output value $net_j$. For the simplest case, this function takes the weighted sum of all impinging signals. That is, $net_j = \Sigma\ w_{ij}o_j$. More complex combinations occur if there are different types of connections. For example, each connection type might have to be summed separately and then combined. In this case, let $net_{ij}$ be the net input of connection type i to $u_j$. The most common case of multiple input types is for differentiating excitatory vs. inhibitory inputs. Often these types can be combined by simply using positive and negative weights.

Second, this net input value is used in calculating the activation value. The activation value for an arbitrary unit i at time t, $a_i(t)$, represents the current state of the unit. This set of activation values may be continuous or discrete. Continuous values are only bounded between some interval, for example, 0 to 1. Discrete values are either binary, $\{0,1\}$ or $\{-1,1\}$; or range over a small set of values such as $\{1,2,\ldots,9\}$. The choice of activation values often has an important impact on the characteristics of computation. The state of the system is simply the vector $a(t)$, representing the state of activation for each unit at time t. This state vector is also called the pattern of activation. A function F can be defined that takes $a_i(t)$ and $net_{ij}$ and calculates a new state of activation. The activation function may take on a number of different forms. The simplest case is where the activation value is simply the net input $net_{ij}$. More likely, F is some kind of threshold function with no activation until the net inputs exceeds a certain value. Stochastic, decay, and sigmoid functions have also been used to modulate the activation values.

Third, activation values are used to determine the final output value $o_i(t)$. An output function $f(a_i(t))$ maps the current state of activation $a_i(t)$ to an output value $o_i(t)$. This function may be an identity function, in which case $o_i(t) = a_i(t)$. Other common alternatives include thresholding or stochastic.

In a neural network, interprocessor connections are much more than simple communication links. The connections actually encode what patterns the network can identify. In addition to connectivity, the interconnections also have an associated weight or strength. A convenient way to represent this property is by using a weight matrix W. An element in W, $w_{ij}$, denotes the strength of connection j to i. For a simple case, positive weights represent excitatory connections while negative weights represent inhibitory connections. A value of 0 means there is no connection between the units.

More complex patterns may be needed for different types of connections. In this case, there will be a weight matrix $W_i$ for each connection type. As mentioned above, the distinction between excitatory and inhibitory connections is only needed if they have different net input functions. Also, W could be more than two-dimensional. For instance, instead of the normal "biconnection", described above, there could be a "triconnection" between three units. In this case, each element in W would have three indices $w_{ijk}$. This idea can be extended to an arbitrary number of connections represented by higher dimensional weight matrices.

The topology of neural network interconnections can be very diverse. In the simplest case, there may be a single layer of fully interconnected processors. More often, the network is divided into multiple layers with full interconnection between layers but not with every neuron. One layer of neurons may be used to input values into the network, while another layer may output the final results. In between the input and output layer, there may be intermediate or hidden layers. The hidden layers are necessary to allow solutions of non-linear problems. When the weighting matrices and various parameters associated with the activation functions have been set to correct levels, a complex stimulus pattern at the input layer successively propagates between hidden layers, to result in an often simpler output pattern, such as only one output layer unit having a significantly strong output. The network is "taught" by feeding it succession of input patterns and corresponding expected output patterns; the network "learns" by measuring, directly or indirectly, the difference or error (at each output unit) between the desired output pattern and the pattern that it just produced. Having done this, the internal weights and activation parameters of the hidden layer(s) are modified by a learning algorithm to provide an output pattern which more closely approximates the desired output pattern, while minimizing the error over the spectrum of input patterns. Neural network learning is an iterative process, involving multiple "lessons". Neural networks have the ability to process information in the presence of noisy or incomplete data and yet still generalize to the correct solution.

In order to adjust the weights and activation parameters of the neural network, a learning algorithm must be applied. One of the more widely used learning algorithms is the Back Propagation method, which is described in U.S. Pat. No. 4,893,255, issued to M. S. Tomlinson, Jr. on Jan. 9, 1990, which is incorporated herein by reference. Back Propagation is essentially the backward propagation of error through the network with the changes being proportional to the error signals whose calculation begins at the output of the network. Essentially, the error is first calculated for the output layer and then this error value utilized to calculate weight changes for units that feed into the output layer, which in turn uses weights for successive layers until the process terminates back at the input layer.

To minimize the number of hidden units necessary to map the input space, one technique that has been developed is to generate localized receptive fields. This is disclosed in John Moody and Christian Darken, *Learning with Localized Receptive Fields*, "Proceedings 1988 Connectionist Models Summer School". Moody discloses a multi-layered system having hidden units with each hidden unit defining a localized receptive field. This localized receptive field has the parameters thereof varied such that it is located over a specific area of the input space. Learning is accomplished by placing the centers of the receptive fields in only those regions of the input space where data is present. This is accomplished through means of a clustering algorithm, which is sometimes referred to as a "competitive learning" algorithm. This method utilizes only the input data to cluster the receptive fields. Thereafter, only the output weights (receptive field amplitudes) need be calculated utilizing an error signal, which can be accomplished with backwards propagation.

The Moody system has a number of disadvantages in that a large number of hidden units are required in order to sufficiently map an input space in a non-linear manner. Therefore, there exists a need for an improved system that allows more efficient mapping of the input space while maintaining some localized nature to the mapping procedure.

SUMMARY OF THE INVENTION

The present invention disclosed and claimed herein comprises a neural network for effecting non-linear mapping of an input space. The neural network includes an input layer for receiving a multi-dimensional input vector $x_i$, for i ranging from 1 to n, n being an integer. A hidden layer is provided having m hidden units, each of the hidden units receiving a plurality of inputs and providing a single output, m being an integer. As used herein, $x_i$ can refer to a multi-dimensional vector of the i'th dimension or to a component. Each of the hidden units has an activation function:

$$a_h = \sum_{i=1}^{n} f_{hi}(X_i - \mu_{hi})$$

where the function $f_{hi}$ is a localized function in the $x_i$ dimension and non-localized in at least one other dimension to extend into the input space thereof. A connection matrix is provided for interconnecting the input layer to the hidden layer such that select ones of the input vectors $x_i$ are connected as inputs to select ones of the hidden units. An output layer is provided that includes M output units. Each of the output units provides a single output $Y_i$, for i ranging from 1 to M, M being an integer. The output units each have a predetermined function $g_1$ associated therewith for i ranging from 1 to N, N being an integer. An output interconnection matrix is provided for interconnecting the outputs of the hidden units to the inputs of predetermined ones of the output units in accordance with an interconnection scheme. Each of the interconnection paths between select ones of the hidden units and select ones of the output units has a weight associated therewith.

In another aspect of the present invention, the activation function is a Gaussian function that is localized about $\mu_{hi}$ with a deviation $\sigma_h$ for the i'th dimension. The activation function is defined as follows:

$$a_h = \sum_{i=1}^{n} C_{hi} \Theta^{-\frac{(X_i - \mu_{hi})^2}{\sigma_h^2}}$$

This activation function localizes the activation of the hidden unit in each of the $x_i$ dimensions and extending from the localized i'th space across each of the other and remaining dimensions.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
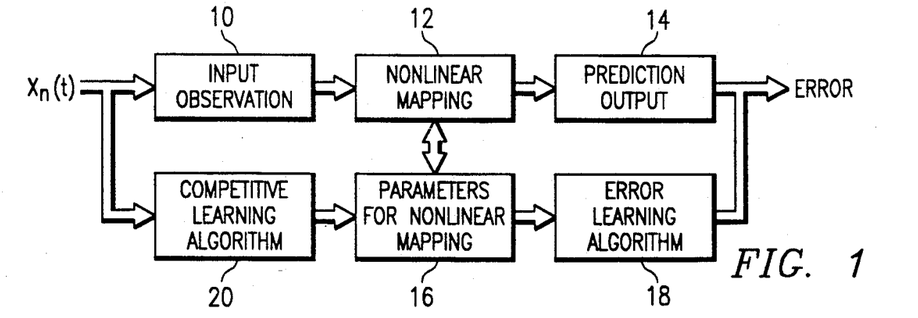
FIG. 1 illustrates a block diagram of the neural network of the present invention.

Referring now to FIG. 1, there is illustrated a block diagram of a neural network operating in accordance with the present invention. In general, the neural network is comprised of an input block 10 wherein an observation is made on an input vector $x_n(t)$, which input vector $x_n(t)$ occupies a multi-dimensional input space. This observation is then input to a non-linear mapping block 12 wherein the input space is mapped. The output of the non-linear mapping block 12 is then input to an output block 14 wherein a prediction is made. This generates an error on the output thereof. The mapping function performed by the non-linear mapping block 12 is controlled by parameters stored in a block 16. If the parameters associated with the mapping function are incorrect for a given input $x_n(t)$ in the input space, an output will result in a prediction error. The output of the network can be, for example, impurity levels in a chemical processing plant, or it could be a yield level in a semiconductor wafer fabrication process.

If the parameters associated with the non-linear mapping function are not correct for a given input $x_n(t)$ within the input space, the network must "learn". There are two methods for learning. First, the error is propagated back through an error learning algorithm 18, which algorithm is preferably Back Propagation, to adjust the parameters in the block 16. In addition, the parameters can be adjusted through a competitive learning algorithm, as represented by box 20, which operates on the input data $x_n(t)$.

Figures 2A, 2B:
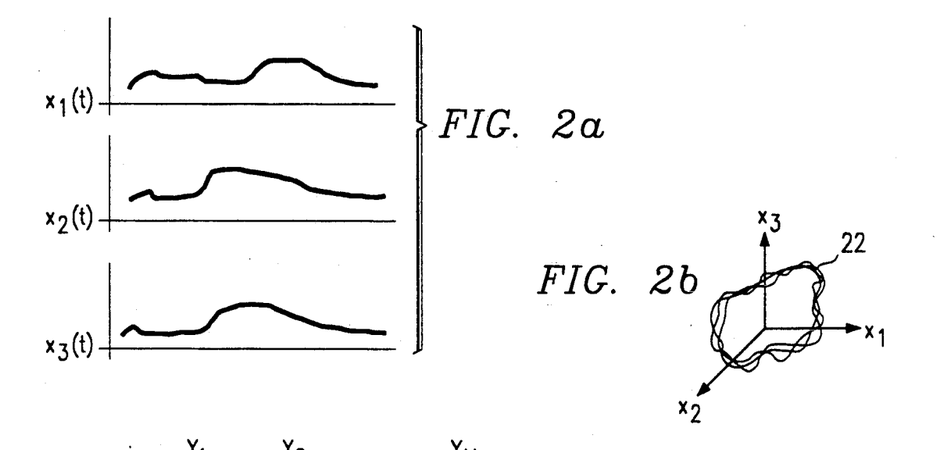
FIGS. 2a and 2b illustrate mapping of the input space onto an attractor.

Referring now to FIGS. 2a and 2b, there is illustrated an example of mapping an input space defined by three chaotic time series $x_1(t)$, $x_2(t)$ and $x_3(t)$. Since the input series is not completely random, there will exist coherence in the scatter plot. This is typically referred to an "attractor". This coherence might for example be defined by reference numeral 22 in the state space $x_1$, $x_2$ and $x_3$. If, for example, one of the three variables is to be predicted from the other two in the learning portion of the neural network, it is necessary to adjust the values associated with the hidden units and the output layer to ensure that the input-output behavior lies on 22.

Figure 3:
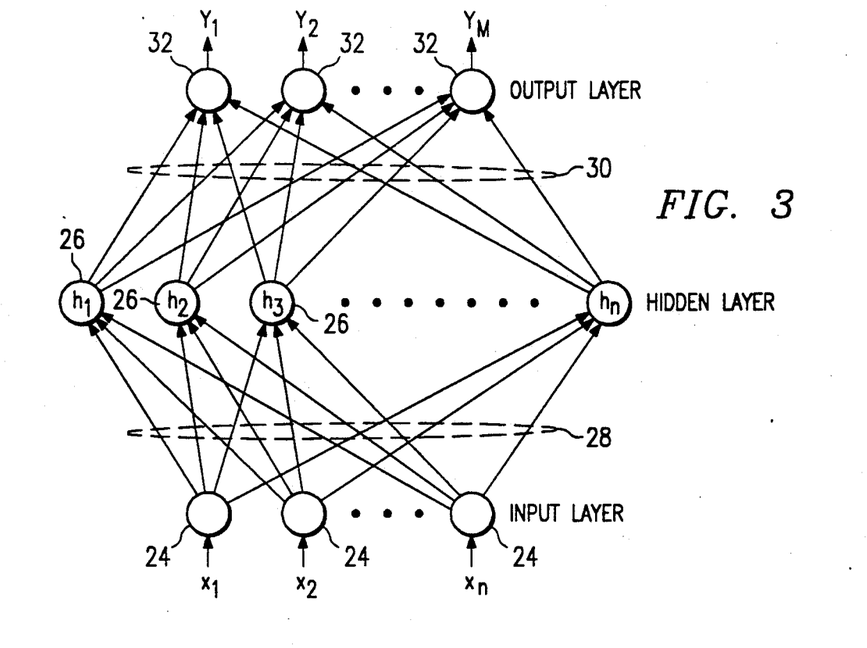
FIG. 3 illustrates a schematic view of the multi-layered structure of the network of the present invention.

Referring now to FIG. 3, there is illustrated a schematic diagram of the neural network of the present invention. An input layer is defined with a plurality of input units 24. Each of the input units 24 receives one input $x_i$ where i varies from 1 to n. The output of each of the input units 24 is connected to a hidden layer, the hidden layer comprised of a plurality of hidden units 26, ranging in value from 1 to m. The interconnection between the input units 24 and the hidden units 26 is made through an interconnection layer 28. In the interconnection layer 28, the output of each of the input units is connected as an input to one or more of the hidden units 26. In some applications, the output of each of the input units 24 may be connected as an input to each and every one of the hidden units 26. The hidden units 26 receive the inputs from the various input units 24 and generate a single output. This single output is then input through a connection layer 30 to the output layer, the output layer comprised of a plurality of output units 32, indexed from 1 to M. Typically, there are m or less input units 24. There are usually far less than m output units 32. The interconnection layer 30 can have the outputs of the hidden units 26 connected as an input to each and every one of the output units 32 or to select ones thereof.

Figures 4, 5A, 5B:
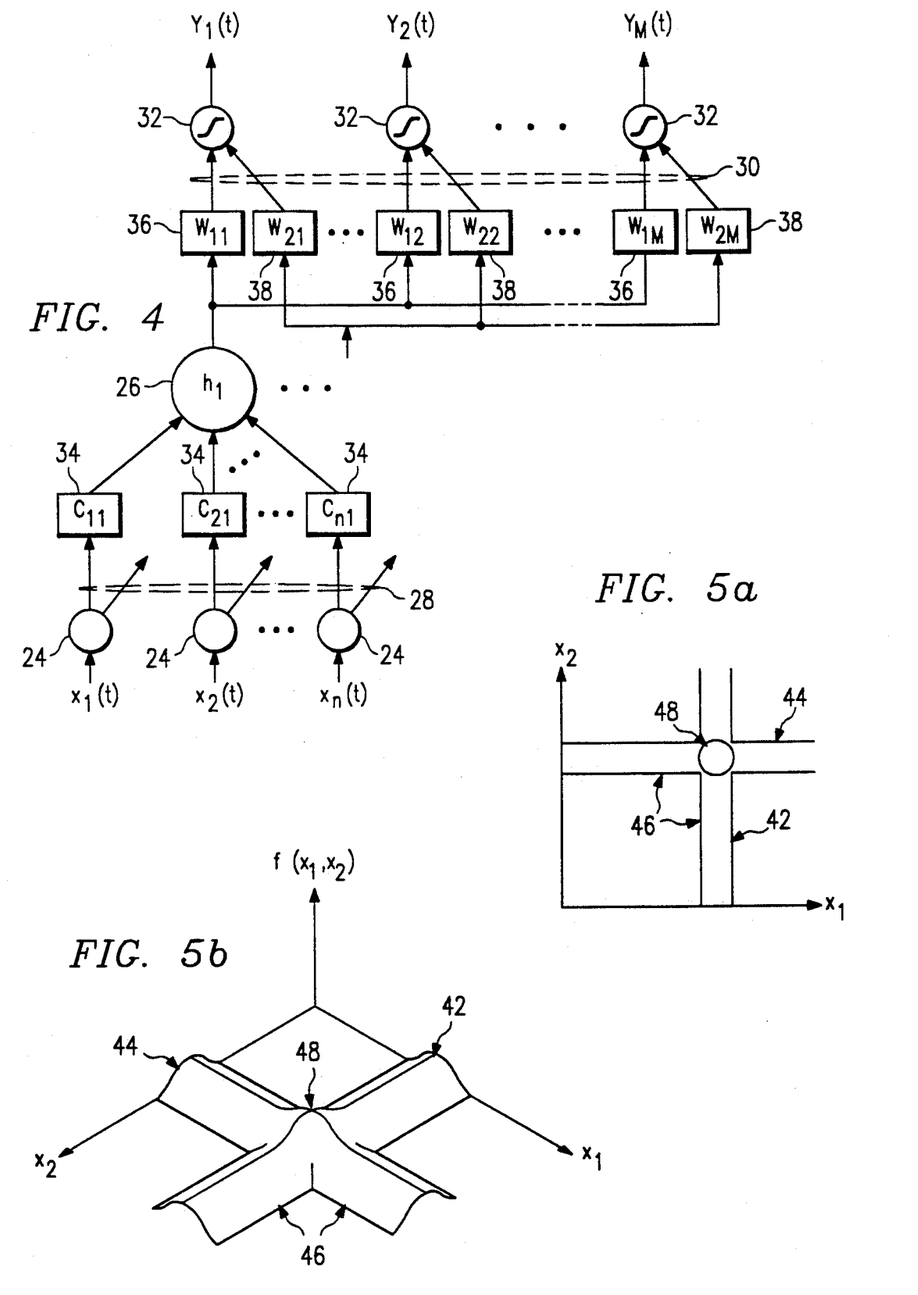
FIG. 4 illustrates a more detailed view of one hidden unit and the interconnection between the hidden unit and the input layer and between the hidden unit and the output layer.
FIG. 5a illustrates the input-to-hidden mapping function of the present invention over two dimensions.
FIG. 5b illustrates a perspective view of the Gaussian bar function of the present invention.

Referring now to FIG. 4, there is illustrated an expanded diagram of one of the hidden units 26 and the interconnection thereof between the input layer and the output layer. Each of the input units 24, as described above, can have the output thereof connected to any one of the hidden units 26, labeled $h_i$, with i ranging from 1 to m. In the embodiment of FIG. 4, only the first hidden unit $h_i$ is illustrated. A weighting factor $c_{hi}$ is associated with each input to the hidden unit 26 for i ranging from 1 to n. The weighting factors are represented by boxes 34 and are contained in a m×n connection matrix. For example, the input vector $x_1(t)$ in the associated input unit 24 would have a weighting value $C_{11}$ associated therewith, as represented by the associated block 34.

The hidden unit 26 outputs a single output to a plurality of weighting boxes 36 labeled $w_{i1}$ where i goes from 1 to M. The output of the weighting box 36 is provided as an input to the associated ones of the output elements 32. In a similar manner, the second hidden unit 26, $h_2$ (not shown), has the output thereof input to weight boxes 38, labeled $w_{i2}$, where i goes from 1 to M.

The output $Y_i$ is defined by the following equation:

$$Y_i(t) = g_i\left(\sum_{h=1}^{m} W_{hi} a_h(t)\right) \quad (3)$$

where:
$g_i$ = an output function
$w_{hi}$ = the weight value for the h'th hidden unit input to the i'th output unit, and
$a_h(t)$ = the activation for the h'th hidden unit The output function $g_i$ is represented generally as a sigmoidal function. The sigmoidal function is described generally in U.S. Pat. No. 4,893,255, which was described above and incorporated herein by reference. However, it should be understood that other functions such as the step function, etc., can be utilized for this output function. As will be described hereinbelow, the present invention primarily deals with the activation function $a_h(t)$ of the hidden units 26.

Referring now to FIGS. 5a and 5b, there is illustrated one example of how the hidden units are mapped into the input space. In FIG. 5a, the input space is defined by dimensions $x_1$ and $x_2$. The response of a single Gaussian Bar unit is provided. A Gaussian Bar, as will be described hereinbelow, is an important aspect of the present invention relative to the activation function of the particular hidden unit in that it provides localization in at least one dimension. A Gaussian Bar 46 is provided that is associated with the input space $x_1$ and $x_2$. The Gaussian Bar 46 has a Gaussian function 42 centered at $\mu_h$ along the $x_1$ axis, or in the $x_1$ space, and is localized only with respect to that axis, in addition to a Gaussian function 44 centered about $\mu_{h2}$ along the $x_2$ axis, or in the $x_2$ space and is localized only with respect to that axis. The sum of these two Gaussian functions forms a cross pattern shown in FIGS. 5a and 5b. This cross pattern is the response of a single Gaussian Bar unit. The Gaussian function monotonically decreases to a value of zero on either side of $\mu_{hi}$ with the peak thereof occurring at $\mu_{hi}$. Each of the Gaussian Bars 42 and 44 extend from its respective input space into the other dimension in a non-localized manner. For example, Gaussian function 42 extends across the $x_2$ space and the Gaussian function 44 extends from the input space $x_2$ into the input space $x_1$.

With reference to FIG. 5b, there is illustrated a perspective view of the Gaussian functions 42 and 44 and Gaussian Bar 46 of FIG. 5a in perspective. It can be seen that the Gaussian function 42 represents a bar shaped response having a Gaussian response along the $x_1$ axis, or input space, and a constant response along the $x_2$ axis or input space, i.e., it extends across the $x_2$ input space in a non-localized manner. The Gaussian function 44 is a similar shape but it is disposed at a right angle to the Gaussian function 42.

The Gaussian Bar 46 has an activation response that is a function of the presence of data in the input spaces $x_1$ or $x_2$ that falls anywhere within the Gaussian functions 42 and 44. Therefore, if data is present in the input space $x_1$ within the Gaussian response centered about $\mu_{h1}$, this will result in firing of the associated hidden unit. By so doing, this allows the hidden unit to extend into other dimensions in a "non-localized" manner; that is, it is only localized in the $x_1$ dimension or the $x_2$ dimension in contrast to the radial basis function networks of Moody which are localized in the $x_1$ dimension and the $x_2$ dimension. In a similar manner, if data falls in the $x_2$ dimension or input space about $\mu_{h2}$, this will result in firing of that hidden unit.

The Gaussian functions 42 and 44 intersect at a point 48. The response of the Gaussian Bar unit at this point is the sum of the maximum activations of Gaussian functions 42 and 44. When data exists in the region 48, this will result in activation of the Gaussian function 42 and activation of the Gaussian function 44 with a strong activation resulting from the region 48. Therefore, the presence of data in the region 48 can be determined from the use of a single Gaussian Bar 46. In this example, two hidden units could also be utilized to generate two Gaussian Bars. It is only necessary that they intersect to cover the input space at the region 48 to localize that point.

Figure 6:
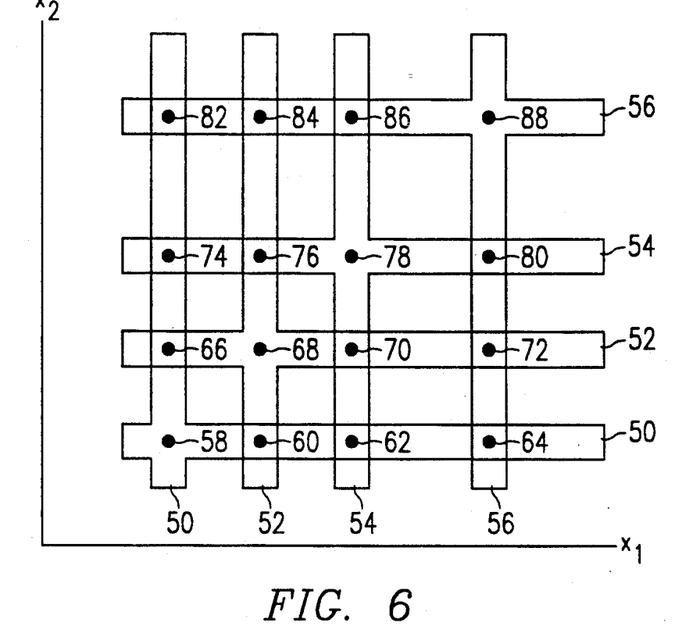
FIG. 6 illustrates one example of the mapping function of the present invention illustrating four hidden units.

Referring now to FIG. 6, there is illustrated a more detailed example similar to the example of FIG. 5a with more input data points in the input space $x_1$, $x_2$. There are four hidden units representing h=1-4 associated with the input space $x_1$, $x_2$. In the input space $x_1$, $x_2$ there are four Gaussian Bars defined, Gaussian Bar 50, Gaussian Bar 52, Gaussian Bar 54 and Gaussian Bar 56. The Gaussian Bars 50-56 are associated with the hidden units 1-4, respectively, and are centered at $\mu_{11}$, $\mu_{21}$, $\mu_{31}$ and $\mu_{41}$, respectively in the $x_1$ direction and centered at $\mu_{52}$, $\mu_{62}$, $\mu_{72}$, and $\mu_{82}$, in the $x_2$ direction, respectively. The Gaussian Bar 50 intersects with each of the Gaussian Bars 50, 54, and 56 at spaces 60, 62, 64, 66, 74 and 82. In a similar manner, the Gaussian Bar 52 intersects with Gaussian Bars 50, 54, and 56 at spaces 66, 70, 72, 60, 76 and 84. Also, Gaussian Bar 54 intersects with Gaussian Bars 50, 52, and 56 at spaces 74, 76, 80, 62, 70 and 86, respectively. Finally, Gaussian Bar 56 intersects with Gaussian Bars 50, 52, and 54 at spaces 82, 84, 86, 64, 72 and 80. It can therefore be seen that sixteen input spaces or potential areas have been mapped with only four hidden units by varying the parameters of the Gaussian Bar, i.e., the center $\mu_{hi}$, the width $\sigma$ and the amplitude. It is only necessary to provide a sufficient number of hidden units associated with any input space that will cover the entire space. If the input space, for example, were divided into n increments, n hidden units would be required to cover a given input space. However, as will be described hereinbelow, a competitive learning algorithm could be utilized with fewer hidden units. The only goal is that the activation of the hidden units is "localized" with respect to one dimension and allowed to extend across the other dimensions in a non-localized manner; that is, the hidden units need only recognize the presence of data at a localized site in one dimension.

Figure 7:
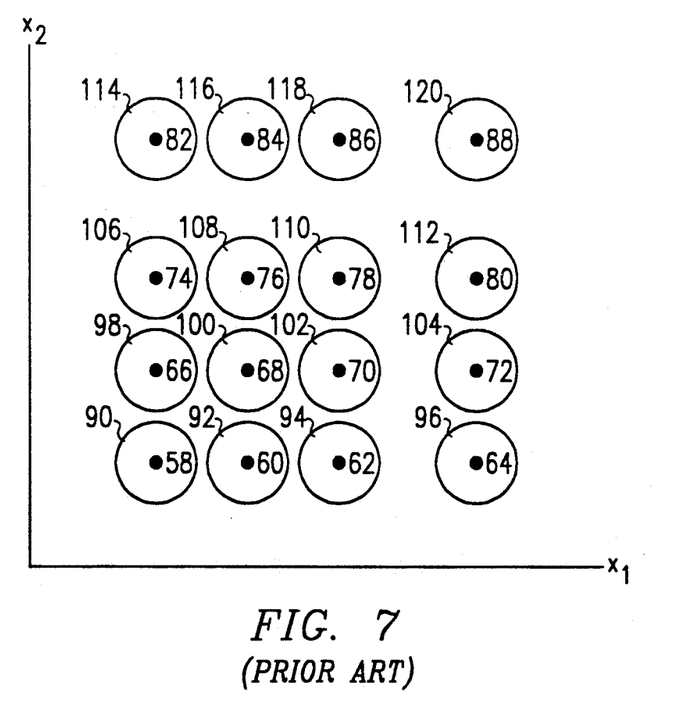
FIG. 7 illustrates a corresponding mapping function of the prior art.

Referring now to FIG. 7, there is illustrated the data sites or spaces 58-88 of FIG. 6 with mapping performed by the prior art Moody system, by way of comparison. Each of the data sites or spaces 58-88, in accordance with the Moody localized receptor concept, is required to have a hidden unit associated therewith. Therefore, sites 58-64 have receptor sites 90-96, respectively, associated therewith. In a similar manner, data sites or spaces 66-72 have receptor sites 98-104, respectively, associated therewith. Also, data sites or spaces 74-80 have receptor sites 106-112, respectively, associated therewith. Finally, data sites 82-88 have receptor sites 114-120, respectively, associated therewith. Therefore, sixteen hidden units are required in order to map the sixteen data sites. This is compared with the concept of the present invention which only requires four hidden units to map the same number of data sites or spaces (with ambiguities on a set of measure zero).

Described above with reference to Equation (1), each of the hidden units has an activation function $a_h(t)$ associated therewith. This activation energy for the Gaussian Bars is defined as follows:

$$a_h = \sum_{i=1}^{n} C_{hi} f_{hi} (X_i - \mu_{hi}, \{P_{hi}\}) \qquad (4)$$

where:
$C_{hi}$ = input weight,
$f_{hi}$ = the localized activation function,
$P_{hi}$ is a set of parameters for the activation function; and
$\mu_{hi}$ = the center of the localized activation function $f_{hi}$.

The activation function $f_{hi}$ is a function (such as a Gaussian) about a single axis or dimension with a single maximum at $\mu_{hi}$ and which drops off to zero at large radii, this referred to as a radial basis function in one dimension. Examples of $f_{hi}$ are as follows:

$$f_{hi}(X_i - \mu_{hi}) = e^{-X_i^2} \qquad (5)$$

$$f_{hi}(X_i - \mu_{hi}) = e^{-\frac{X_i^2}{P_{hi}}} \qquad (6)$$

$$f_{hi}(X_i) = e^{-\frac{(X_i - \mu_{hi})^2}{\sigma_{hi}^2}} \qquad (7)$$

where:
$x_i$ is a set of input vectors,
$P_{hi}$ is a set of parameters and could include a tensor, and
$\mu_{hi}$ and $\sigma_{hi}$ are parameters associated with a Gaussian function, $\mu_{hi}$ being equal to the mean and $\sigma_{hi}$ is the deviation.

Equation (7) represents the preferred embodiment for the activation function, i.e., a Gaussian response. The active function $a_h$ would therefore be equal to:

$$a_h = \sum_{i=1}^{n} C_{hi} f_{hi} (X_i - \mu_{hi}) \qquad (8)$$

$$a_h = \sum_{i=1}^{n} C_{hi} \; e^{-\frac{(X_i - \mu_{hi})^2}{\sigma_h^2}} \qquad (9)$$

It can be seen that the activation function $a_h$ is the sum over i from 1-to-n of $f_{hi}(x_i - \mu_{hi})$. This results, for each i, in localization in one dimension and non-localization in all remaining dimensions. By contrast, the Moody system which utilizes localized field receptors is defined by the following equation:

$$a_h = e^{-\frac{\sum(X_i - \mu_{hi})^2}{\sigma_h^2}} = \pi_i e^{-\frac{(X_i - \mu_{hi})^2}{\sigma_h^2}} \qquad (10)$$

It can be seen that Equation (8) results in the products of terms as compared to the localizing operation of the present invention, as defined by Equation (7), which is merely the sum of terms.

In the preferred embodiment, learning is achieved by Back Propagation. This learning is achieved by inputting training data into the network and measuring the system output $z_i(t)$. The parameters which are learned with $w_{ij}$, $C_{hi}$, $\mu_{hi}$ and $\sigma_{hi}$. The data input in the discrete time samples for the learning process are derived from a segment of a known sample. Typically, learning is achieved by minimizing the Least Mean Square error, E. Back Propagation is essentially a variation of the Least Mean Squares problem which may be solved, for example, by steepest descent. Through Back Propagation, the weights $w_{ij}$ and the parameters associated with the activation function, $\mu_{hi}$ and $\sigma_{hi}$, are varied to minimize the error function.

Back Propagation may be thought of as a particular common, non-linear, Least Squares algorithm. It is a natural, non-linear extension of the linear nets commonly used in adaptive signal processing. Use of the chain rule in computing derivatives of the error output E provides a useful interpretation to the minimization process and allows an easy generalization to multi-layers of non-linear hidden units. For one or more output units, the error output is minimized to:

$$E = \tfrac{1}{2} \sum_{i=0}^{M} (Z_i(t) - y_i(t))^2 \tag{11}$$

where:

$y_i(t)$ = output of output unit i of the neural net: and
$z_i(t)$ = specified target output for a given output pattern for output unit i.

Since the network contains non-linear hidden units, each term $y_i(t)$ contains contribution from the outputs of hidden units in the hidden layer. Because the hidden layer has a non-linear transfer function, the output of the hidden layer will be a non-linear function of its input, and E in Equation (9) becomes a square of a non-linear function of the weights because the hidden layer outputs feed into the topmost output layer.

There are two methods for learning the various parameters of the neural net. In the first, random weights are chosen for the parameters $w_{ij}$, $c_{hi}$, $\mu_{hi}$ and $\sigma_{hi}$. In the second step, back propagation is utilized. Each of the parameters is iteratively adjusted as follows:

$$\text{set: } \Delta W_{ij} = -\eta \frac{\partial E}{\partial W_{ij}} \tag{12}$$

$$\text{set: } \Delta \mu_{hi} = -\eta \frac{\partial E}{\partial \mu_{hi}} \tag{13}$$

$$\text{set: } \Delta C_{hi} = -\eta \frac{\partial E}{\partial C_{hi}} \tag{14}$$

$$\text{set: } \Delta \sigma_{hi} = -\eta \frac{\partial E}{\partial \sigma_{hi}} \tag{15}$$

Figure 8:
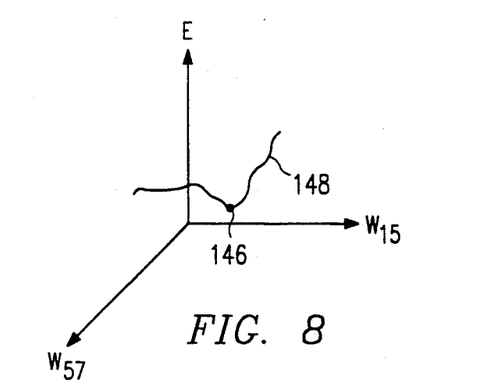
FIG. 8 illustrates a graph of the learning algorithm for minimizing error and adjusting the weighting values.

With reference to FIG. 8, a curve 144 is defined, for example, by the weights $w_{13}$ and $w_{57}$, the curve 144 having a global minimum 146, which defines the best fit in this particular space. This global minimum is achieved by, for example, a gradient descent method.

The parameters of the activation function to some extent can be learned through competitive learning algorithms. For example, in the first step:

$$\text{set: } \mu_{hi} = x_i(h) \text{ for } h = 1, \ldots m \tag{16}$$

in the second step, iteratively:

$$\text{set: } \Delta \mu_{hi} = \eta \, (x_i(t) - \mu_{hi}) \text{ for closest } \mu_{hi} \tag{17}$$

the third step we would set the values $w_{hi}$, $\sigma_{hi}$ and $c_{hi}$ according to the Back Propagation algorithm.

When dealing with the three-layered network of FIG. 3, it can be seen that input layer consists of n units, the hidden layer consists of m units and the output layer consists of M units. The connections between the input layer and the hidden layer are fixed, random weights and are given by an m×n matrix. These are the input weights $C_{ij}$, which may be variable. The connections between the hidden layer and the output layer are given by a n×M connection matrix. The output connection matrix defines the weights between the hidden layer and the output layer, the weights defined as $w_{ij}$. These are modified by the Back Propagation learning algorithm. Sometimes the number of hidden units is much larger than the number of input units so that the first layer effectively expands the n-bit input pattern into the large m-dimensional space defined by the hidden layer. In this case, most of the hidden units 26 in the hidden layer are not active, so the hidden unit layer can be viewed as a type of sparse coding of the input pattern. This sparse connectivity is defined in D. Marr, "A Theory of Cerebellar Cortex", which is incorporated herein by reference.

Figure 9:
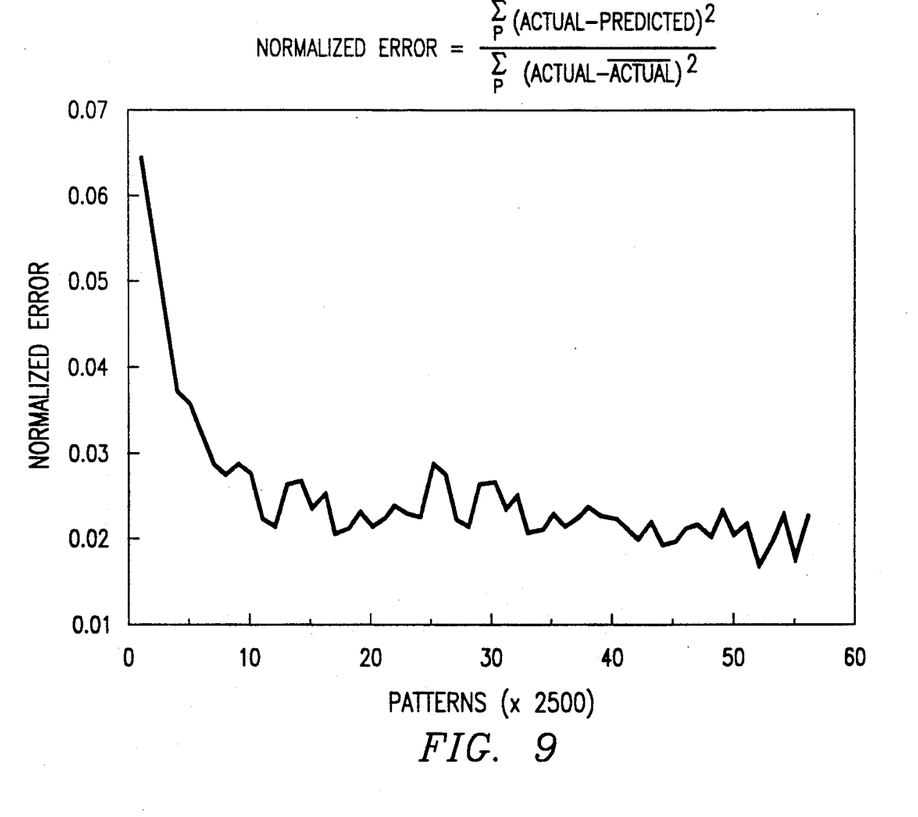
FIG. 9 illustrates a graph representing one application of the neural network.

With reference to FIG. 9, there is illustrated a graph of normalized error vs. the number of patterns. The normalized error is defined by the following equation:

$$\text{Normalized } E = \frac{\sum_p (\text{actual} - \text{predicted})^2}{\sum_p (\text{actual} - \overline{\text{actual}})^2} \tag{18}$$

The data was comprised of five input vectors, $x_1$-$x_5$ with a target output, defined by the following partial table:

TABLE

| Time Step | $X_1$ | $X_2$ | $X_3$ | $X_4$ | $X_5$ | z (t) |
|---|---|---|---|---|---|---|
| 0.000000 | 0.800000 | 0.800000 | 0.800000 | 0.800000 | 0.400000 | 0.585440 |
| 1.000000 | 0.585440 | 0.585440 | 0.585440 | 0.585440 | 0.878160 | 0.888039 |
| 2.000000 | 0.888039 | 0.888039 | 0.888039 | 0.888039 | 0.391495 | 0.363798 |
| 3.000000 | 0.363798 | 0.363798 | 0.363798 | 0.363798 | 0.871671 | 0.876872 |
| 4.000000 | 0.846872 | 0.846872 | 0.846872 | 0.846872 | 0.409298 | 0.474499 |
| 5.000000 | 0.474499 | 0.474499 | 0.474499 | 0.474499 | 0.884648 | 0.912371 |
| 6.000000 | 0.912371 | 0.912371 | 0.912371 | 0.912371 | 0.373387 | 0.292539 |
| 7.000000 | 0.292539 | 0.292539 | 0.292539 | 0.292539 | 0.856093 | 0.757267 |
| 8.000000 | 0.757267 | 0.757267 | 0.757267 | 0.757267 | 0.450781 | 0.627575 |
| 9.000000 | 0.672575 | 0.672575 | 0.672575 | 0.672408 | 0.905886 | 0.856777 |
| 10.000000 | 0.805777 | 0.805777 | 0.805777 | 0.806610 | 0.311953 | 0.572582 |
| 11.00000 | 0.572582 | 0.572635 | 0.572582 | 0.568730 | 0.785362 | 0.895574 |
| 12.00000 | 0.895574 | 0.895464 | 0.895574 | 0.898465 | 0.616793 | 0.341650 |
| 13.00000 | 0.341650 | 0.342300 | 0.341650 | 0.331257 | 0.864839 | 0.822119 |
| 14.00000 | 0.822119 | 0.823252 | 0.822119 | 0.808266 | 0.427695 | 0.537629 |
| 15.00000 | 0.537629 | 0.534198 | 0.537629 | 0.568686 | 0.895595 | 0.908648 |
| 16.00000 | 0.908648 | 0.909870 | 0.908648 | 0.897078 | 0.342287 | 0.306794 |
| 17.00000 | 0.306794 | 0.302503 | 0.306794 | 0.335357 | 0.824037 | 0.781860 |
| 18.00000 | 0.781860 | 0.776120 | 0.781860 | 0.811824 | 0.529498 | 0.617732 |
| 19.00000 | 0.617732 | 0.627967 | 0.617732 | 0.564884 | 0.911870 | 0.867519 |
| 20.00000 | 0.867519 | 0.860966 | 0.867519 | 0.896410 | 0.293092 | 0.412779 |
| 21.00000 | 0.412779 | 0.426350 | 0.412779 | 0.344895 | 0.757025 | 0.881303 |

TABLE-continued

| Time Step | $X_1$ | $X_2$ | $X_3$ | $X_4$ | $X_5$ | $z(t)$ |
|---|---|---|---|---|---|---|
| 22.00000 | 0.881303 | 0.889577 | 0.881303 | 0.827865 | 0.673415 | 0.395489 |
| 23.00000 | 0.395489 | 0.374981 | 0.395489 | 0.518215 | 0.806838 | 0.879253 |
| 24.00000 | 0.879253 | 0.869043 | 0.879253 | 0.903461 | 0.560891 | 0.380097 |
| 25.00000 | 0.380097 | 0.397783 | 0.380097 | 0.337732 | 0.905618 | 0.856170 |
| 26.00000 | 0.856170 | 0.866937 | 0.856170 | 0.831231 | 0.308352 | 0.457457 |
| 27.00000 | 0.457457 | 0.441084 | 0.457457 | 0.496326 | 0.782863 | 0.908129 |
| 28.00000 | 0.908129 | 0.906101 | 0.908129 | 0.913503 | 0.613396 | 0.303066 |
| 29.00000 | 0.303066 | 0.307286 | 0.303066 | 0.294972 | 0.874140 | 0.771228 |
| 30.00000 | 0.771228 | 0.774848 | 0.771228 | 0.765570 | 0.390128 | 0.647075 |
| 31.00000 | 0.647075 | 0.643166 | 0.647075 | 0.651184 | 0.862686 | 0.834746 |
| 32.00000 | 0.834746 | 0.836986 | 0.834746 | 0.834719 | 0.452632 | 0.505247 |
| 33.00000 | 0.505247 | 0.502907 | 0.505247 | 0.499558 | 0.910564 | 0.914645 |
| 34.00000 | 0.914645 | 0.914673 | 0.914645 | 0.914310 | 0.298902 | 0.285619 |
| 35.00000 | 0.825619 | 0.285629 | 0.285619 | 0.287759 | 0.772897 | 0.746783 |
| 36.00000 | 0.746783 | 0.746591 | 0.746783 | 0.751471 | 0.630431 | 0.691358 |
| 37.00000 | 0.691358 | 0.692026 | 0.691358 | 0.680236 | 0.861504 | 0.781826 |
| 38.00000 | 0.781826 | 0.780453 | 0.781826 | 0.800047 | 0.420955 | 0.621357 |
| 39.00000 | 0.621357 | 0.625072 | 0.621357 | 0.576253 | 0.884368 | 0.863617 |

The program that was utilized to generate the curve of FIG. 9 is as follows:

```
           illustrates gaussian bars backpropagation
           allocations  of data structures not shown (will not compile)
           Eric Hartman   Feb 1990
*/ boolean lflag = 1;
int     epochno = 0;
int     nepochs = 500;
int     patno = 0;
float   tss = 0.0;
float   pss = 0.0;
float   normerr = 0.0;
float   stdvdata = 0.22;
float   avgpss = 0.0;
float   maxpss = 0.0;
float   maxerr = 0.0;
float   lecrit = 0.0;
float   tecrit = 0.0;
float   *netinput = NULL;
float   *activation = NULL;
float   *target = NULL;
float   *error = NULL;
float   *delta = NULL;
float   gdelta = 0.0;
float   **xdelta = NULL;
float   **ydelta = NULL;
float   **winc = NULL;
float   **dweight = NULL;
float   *binc = NULL;
float   *dbias = NULL;
float   **xpar = NULL;
float   **dxpar = NULL;
float   **xinc = NULL;
float   **ypar = NULL;
float   **dypar = NULL;
float   **yinc = NULL;
float   gain = 0.5;
float   dgain = 0.0;
float   ginc = 0.0;
float   grate = 0.05;
float   xrate = 0.05;
float   xinit = 0.5;
boolean xrand = 0;      /* in reset: 0:xvar=xinit 1:xvar=random */
float   yrate = 0.05;
float   ymin = 0.5;
float   yinit = 0.5;
boolean yrand = 0;      /* in reset: 0:yvar=yinit 1:yvar=random */
boolean wpos = 0;       /* in reset: 0:weights normal 1:weights all pos */
int     ftype = 1;      /* 0:sigmoids
                           1:gaussian bars
                           2:radial basis functions */
```

```
        boolean ivar   = 1;       /* for ftype of 1 or 2:
                                       0:single variance per hidden
                                       1:different variance for each input */
int     rfsize = 0;       /* receptive field size.  0:global */
float   momentum = 0.9;

float   *sites = NULL;
float   *work = NULL;
int     *insites = NULL;
int     *outsites = NULL;
float   **pats = NULL;
int     nsites;           /* lattice size */
int     tsteps;           /* number of time steps to predict */
float   rpar;             /* logistic map bifurcation param */
int     ppr;
int     geninit = 0;

int     nvisibles;
int     nhiddens;
boolean linout = 0;       /* if linout=1, outputs have linear act fns */
boolean discrete = 1;     /* discrete pattern/target values */
float   scale = 0.5;      /* these defaults = logistic */
float   shift = 1.0;
float   hi    = 1.0;
float   lo    = 0.0;

train(c) char c; {
    int     t,i,old,npat;
    int     freqcntr, blockcntr;
    int     maxpats;
    char    *sp,*str;
    struct Variable *vp;

for (t = 0; t < nepochs; t++) {                /* epoch loop */
        epochno++;

tss = 0.0;
        avgpss = 0.0;
        maxpss = 0.0;
        maxerr = 0.0;

for (i = 0; i < maxpats; i++) {            /* pattern loop */
            patno = i;
            if(trial() == BREAK) return(BREAK);
            if (lflag) {
                compute_winc();
                change_weights();
            }
        }
        avgpss = tss/maxpats;
        normerr = sqrt(avgpss)/stdvdata;
    }
} trial() {
    if (generate)
        generate_and_set();
    else if (disk)
        read_and_set();
    else
        setup_pattern();
    compute_output();
    compute_error();
    sumstats();
    return(CONTINUE);
} sumstats() {
  register int    i,j;
  float uniterr, abserr;

for (i = 0, j = nunits - noutputs; i < noutputs; i++, j++) {
    uniterr = target[i] - activation[j]  ;
```

```
        abserr = (float) fabs ( (double) uniterr);
        pss += uniterr * uniterr;
    }
    tss += pss;
}
compute_output() {
    register int    h,i,f,nf;
    float *sender, *wt, *end;
    float net, mt, sm;
    double tar,out;

if (ftype==1)                                               /* bars */
        for (h = ninputs; h < nunits-noutputs; h++) {
            if (rfsize) {
                i = h-ninputs;
                nf= rfsize;
            }
            else {
                i = 0;
                nf= ninputs;
            }
            sm = 0.0;
            for (f=0 ; f < nf; i++,f++) {
                if (rfsize && i==ninputs)
                    i=0;                             /*wraparound*/
                mt = activation[i] - xpar[h][i];
                if (ivar)
                    sm += (float)(exp((double)(-(mt*mt)/ypar[h][i])));
                else
                    sm += (float)(exp((double)(-(mt*mt)/ypar[h][0])));
            }
            activation[h] = sm;
        } for (i = nunits-noutputs; i < nunits; i++) {
        net = bias[i];
        sender = &activation[first_weight_to[i]];
        end = sender + num_weights_to[i];
        wt = weight[i];
        for (; sender < end ;)
            net += (*sender++)*(*wt++);
        netinput[i] = net;
        if (linout)
            activation[i] = gain * net;
        else
            activation[i] =(float)(scale*(shift+tanh((double)(gain*net))));
    }

} compute_error() {
    register int h,i,j,first,num,f,nf;
    float *wt, *sender, *end;
    float del, th, d,n,e, act;

if (lms==0)
        for (i = ninputs; i < nunits - noutputs; i++)           /* hiddens */
            error[i] = 0.0;

for (i = nunits - noutputs, j = 0; i < nunits; i++, j++)    /* outputs */
        error[i] = target[j] - activation[i];

for (i = nunits-1; i >= nunits-noutputs; i--) {
        if (linout)
            del = error[i] * gain;
        else {
            th = (activation[i] / scale) - shift;
            del = error[i] * scale * gain * (1.0 + th) * (1.0 - th);
        }
        if (linout)
            gdelta  = error[i] * netinput[i];
        delta[i] = del;
```

```
        sender = &error[first_weight_to[i]];
        end = sender + num_weights_to[i];
        wt = weight[i];
        for (;sender < end;)
            *sender++ += del * (*wt++);
    } if (ftype==1)                                          /* bars */
        for (h = nunits-noutputs-1; h>=ninputs; h--) {
            if (rfsize) {
                i = h-ninputs;
                nf= rfsize;
            }
            else {
                i = 0;
                nf= ninputs;
            }
            delta[h] = error[h];
            for (f=0 ; f < nf; i++,f++) {
                if (rfsize && i==ninputs)
                    i=0;                                   /*wraparound*/
                d = activation[i] - xpar[h][i];
                if (ivar)
                    n = d/ypar[h][i];
                else
                    n = d/ypar[h][0];
                e = (float)(exp((double)(-d*n)));
                xdelta[h][i] = delta[h] * 2.0 * n * e;
                if (ivar)
                    ydelta[h][i]  = delta[h] * n * n * e;
                else
                    ydelta[h][0] += delta[h] * n * n * e;
            }
        }
} compute_winc() {
    register int   h,i,j;
    float *wi, *ep, *sender, *end;
    float del;

for (i = nunits-noutputs; i < nunits; i++) {           /* outputs */
        ginc    += grate * gdelta;
        del     = delta[i];
        binc[i] += lrate * del;
        sender = &activation[first_weight_to[i]];
        end = sender + num_weights_to[i];
        wi = winc[i];
        for (;sender < end;)
            *wi++ += lrate * del * (*sender++);
    } for (h = ninputs; h < nunits-noutputs; h++) {          /* hiddens */
        for (i = 0; i < ninputs; i++) {
            xinc[h][i] += xrate * xdelta[h][i];
            if (ivar || i==0)
                yinc[h][i] += yrate * ydelta[h][i];
        }
    }
} clear_winc() {
    register int   h, i,j,num;
    register float *wi, *end;
    for (i = ninputs; i < nunits; i++) {
        ginc = binc[i] = 0.0;
        wi = winc[i];
        end = wi + num_weights_to[i];
        for (; wi < end;)
            *wi++ = 0.0;
```

```
        }
      for (h = ninputs; h < nunits-noutputs; h++)
        for (i = 0; i < ninputs; i++) {
          xinc[h][i] = 0.0;
          if (ivar || i==0)
            yinc[h][i] = 0.0;
        }
} change_weights() {
    register int    h,i;
    register float *wt, *dwt, *wi, *end;

if (ftype==0 && lms==0)
       for (h = ninputs; h < nunits-noutputs; h++) {        /* hiddens */
          dgain    = ginc    + momentum * dgain;
          gain    += dgain;
          ginc     = 0.0;
          dbias[h] = binc[h] + momentum * dbias[h];
          bias[h] += dbias[h];
          binc[h]  = 0.0;
          wt  = weight[h];
          dwt = dweight[h];
          wi  = winc[h];
          end = wt + num_weights_to[h];
          for (; wt < end; ) {
              *dwt   = *wi + momentum * (*dwt);
              *wt   += *dwt++;
              *wi++  = 0.0;
              *wt++;
          }
       } if (ftype >0 && lms==0)
       for (h = ninputs; h < nunits-noutputs; h++) {        /* hiddens */
          for (i=0; i<ninputs; i++) {
              dxpar[h][i] = xinc[h][i] + momentum * dxpar[h][i];
              xpar[h][i] += dxpar[h][i];
              xinc[h][i]  = 0.0;
              if (ivar || i==0) {
                 dypar[h][i] = yinc[h][i] + momentum * dypar[h][i];
                 ypar[h][i] += dypar[h][i];
                 if (ypar[h][i] < ymin)
                     ypar[h][i] = ymin;
                 yinc[h][i]  = 0.0;
              }
          }
       } for (i = nunits-noutputs; i < nunits; i++) {           /* outputs */
          dgain    = ginc    + momentum * dgain;
          gain    += dgain;
          ginc     = 0.0;
          dbias[i] = binc[i] + momentum * dbias[i];
          bias[i] += dbias[i];
          binc[i]  = 0.0;
          wt  = weight[i];
          dwt = dweight[i];
          wi  = winc[i];
          end = wt + num_weights_to[i];
          for (; wt < end; ) {
              *dwt   = *wi + momentum * (*dwt);
              *wt   += *dwt++;
              *wi++  = 0.0;
              *wt++;
          }
    }
} setup_pattern() {
    setinput();
    settarget();
```

```
} setinput() {
    register int    i,prev_index;
    register float  *pp;

for (i = 0, pp = ipattern[patno]; i < ninputs; i++, pp++)
        activation[i] = *pp;
} settarget() {
    register int    i;
    register float *pp;

for (i = 0, pp = tpattern[patno]; i < noutputs; i++, pp++)
        target[i] = *pp;
} init_lattice() {
  int i;

for (i = 0; i < nsites/3; i++)
    sites[i] = 0.4;
  for (; i < 2*nsites/3; i++)
    sites[i] = 0.8;
  for (; i < nsites; i++)
    sites[i] = 0.4;
  for (i = 0; i < 100; i++) tstep();
} generate_and_set() {
int i;
    register float  *pp;

if (!geninit)
        generate_init();

tstep();
    for (i = 0; i < noutputs; i++)
        target[i] = sites[outsites[i]];
    for (i=0; i<ninputs; i++)
        pats[ppr][i] = sites[insites[i]];
    ppr++; if (ppr==(tsteps+1)) ppr = 0;
    for (i = 0, pp = pats[ppr]; i < ninputs; i++, pp++)
        activation[i] = *pp;

} generate_init()

{
  int t,i;

for (i = 0; i < nsites/3; i++)
    sites[i] = 0.4;
  for (; i < 2*nsites/3; i++)
    sites[i] = 0.8;
  for (; i < nsites; i++)
    sites[i] = 0.4;
  for (t = 0; t < tsteps+1; t++) {
    if (!geninit)
      pats[t] = ((float *) emalloc((unsigned)(sizeof(float)*ninputs)));
    for (i = 0; i < ninputs; i++)
      pats[t][i] = 0.0;
  }
  ppr = 0;
  for (ppr = 0 ; ppr < tsteps; ppr++) {
    tstep();
    for (i=0; i<ninputs; i++)
      pats[ppr][i] = sites[insites[i]];
  }
  geninit = 1;
```

```
}
tstep() {
  register int i;

for (i=0; i<nsites; i++)
    work[i] = rpar * sites[i] * (1.0 - sites[i]);
  for (i=1; i<(nsites+1)/2; i++)
    sites[nsites-1-i] = sites[i] =
                 0.333333333333 * (work[i-1]+work[i]+work[i+1]);
  sites[nsites-1] = sites[0] =
                 0.333333333333 * (work[nsites-1]+work[0]+work[1]);
}
```

In summary, there has been provided a neural network having multiple layers with at least one layer of hidden units having a semi-localized non-linear activation function associated therewith. The non-linear activation function allows for non-linear mapping of the input space to the network output. Each of the hidden units in the hidden layer has an activation function that is localized along one input space or dimension and extends across the mapping input dimensions in a non-localized manner. Therefore, a fewer number of hidden units are required to map multi-dimensional input spaces.

Although the preferred embodiment has been described in detail, it should be understood that various changes, substitutions and alterations can be made therein without departing from the spirit and scope of the invention as defined by the appended claims.

What is claimed is:

1. A neural network for effecting non-linear mapping of an input space, comprising:
   an input layer for receiving a multi-dimensional input vector $x_i$, for i ranging from 1 to n, n being an integer;
   a hidden layer, having m hidden units, m being an integer, each of said hidden units receiving a plurality of inputs and providing a single output and having an activation function:

$$a_h = \sum_{i=1}^{n} C_{hi} f_{hi} (x_i - \mu_{hi}, \{P_{hi}\})$$

where:
   h is the number of the associated one of said hidden units,
   $\mu_{hi}$ is the center of $a_h$,
   $f_{hi}$ is a localized function in the $x_i$ dimension and non-localized in at least one other of said $x_i$ dimensions,
   $C_{hi}$ is a constant and $\{P_{hi}\}$ is a set of parameters for $f_{hi}$;
   a connection matrix for interconnecting the output of select ones of the input vectors $x_i$ to the inputs of said hidden units in accordance with an interconnection scheme;
   an output layer comprising M output units, M being an integer, each of said output units for providing a single output $Y_i$ for i ranging from 1 to M, each of said output units having a predetermined transfer function g for i ranging from 1 to M; and
   an output interconnection matrix for interconnecting the output of select ones of said hidden units to the inputs of select ones of said M output units in accordance with an interconnection scheme, each of said interconnections between the output of said hidden units and the associated one of said M output units having an output weight associated therewith.

2. The neural network of claim 1 wherein said activation function $a_h$ is Gaussian according to the following equation:

$$a_h = \sum_{i=1}^{n} C_{hi} e^{-\frac{(x_i - \mu_{hi})^2}{\sigma_{hi}^2}}$$

where:
   $\sigma_{hi}$ = the standard deviation.

3. The neural network of claim 1 wherein the constant $C_{hi}$ comprises input weights associated with each interconnection between one of said input vectors $x_i$ and the interconnected one of the inputs of said hidden units.

4. The neural network of claim 1 wherein said predetermined transfer function $g_i$ in said m output units is a sigmoidal function.

5. The neural network of claim 1 wherein said output weights are variable.

6. The neural network of claim 5 and further comprising learning means for varying the value of $\mu_{hi}$ in said activation function and said output weights in response to the input of known values for said input vectors and a predetermined target output such that said target output is realized after a finite number of said known input values are input to said input layer.

7. The neural network of claim 6 wherein said learning algorithm is a Back Propagation learning algorithm.

8. The neural network of claim 6 wherein said means for minimizing the error minimizes the error in accordance with a competitive learning algorithm.

9. The neural network of claim 1 wherein the output of each of said output units is defined by the following relationship:

$$Y_i = g_i \left( \sum_{h=1}^{m} W_{hi} a_h(t) \right)$$

where:
   i ranges from 1 to M
   h is the number of said hidden unit from 1 to m, and
   $w_{hi}$ is the value of said output weight on the output of the h'th one of said hidden units.

10. A method for mapping an input space in the neural network, comprising the steps of:
   receiving a multi-dimensional input vector $x_i$, for i ranging from 1 to n, n being an integer;

providing m hidden units, m being an integer, each of the hidden units providing a single output value and having an activation function:

$$a_h = \sum_{i=1}^{n} f_{hi}(X_i - \mu_{hi})$$

where:
- h is the number of the associated one of the hidden units,
- $\mu_{hi}$ is the localized center of $a_h$ in the $x_1$ dimension, and
- $f_{hi}$ is a localized function in the $x_i$ dimension and non-localized in at least one other of the $x_i$ dimensions;

interconnecting the output of select ones of the input vectors $x_i$ to the inputs of the hidden units in accordance with an interconnection scheme;

providing a plurality of output units in an output layer, each of the output units for providing a single output $y_i$ for i ranging from 1 to M, M being an integer, each of the output units having associated therewith a predetermined control function g; and interconnecting the output of select ones of the hidden units to the inputs of predetermined ones of the M output units in accordance with the predetermined interconnection scheme, each of the interconnections between the output of the hidden units and the associated one of the M output units having an output weight associated therewith.

11. The method of claim 10 wherein the activation function of each of the hidden units is defined as a Gaussian function according to the following equation:

$$a_h = \sum_{i=1}^{n} C_{hi} e^{-\frac{(x_i - \mu_{hi})^2}{\sigma_{hi}^2}}$$

where
$\sigma_{hi}$ = the standard deviation of a Gaussian function.

12. The method of claim 10 wherein the function $f_{hi}$ is non-localized for all of the dimensions other than the i dimension.

13. The method of claim 10 and further comprising weighting the interconnection between each of the input vectors $x_i$ and the interconnected one of the inputs of the hidden units.

14. The method of claim 10 wherein the function g in the M output units comprises a sigmoidal function.

15. The method of claim 10 and further comprising varying the value of the output weights.

16. The method of claim 15 and further comprising:
inputting a plurality of known input values to the input vectors $x_i$, each of the known input values having associated therewith a known target output value;
comparing the known target value with the actual output value from the output units for a given one of the known input values input to the network;
determining the error between the actual output value and the associated known target value; and
varying the value of $\mu_{hi}$ in the activation function and the output weights to minimize the error.

17. The method of claim 16 wherein the step of minimizing the error comprises minimizing the error in accordance with a Back Propagation learning algorithm.

* * * * *